United States Patent

Urbanek et al.

[11] Patent Number: 6,155,816
[45] Date of Patent: Dec. 5, 2000

[54] RETURN FLOW SHUT-OFF DEVICE FOR AN INJECTION UNIT IN AN INJECTION MOULDING MACHINE

[75] Inventors: Otto Urbanek, Linz; Peter Baldinger, Enns; Reinhold Ebner, Trofaiach; Walther Pitscheneder, Sierning; Elmar Brandstätter, Leoben, all of Austria

[73] Assignee: Engel Maschinenbau Gesellschaft m.b.H., Schwertberg, Austria

[21] Appl. No.: 09/029,555

[22] PCT Filed: Oct. 4, 1996

[86] PCT No.: PCT/AT96/00184

§ 371 Date: Feb. 25, 1998

§ 102(e) Date: Feb. 25, 1998

[87] PCT Pub. No.: WO97/12743

PCT Pub. Date: Apr. 10, 1997

[30] Foreign Application Priority Data

Oct. 4, 1995 [AT] Austria ................................. 1639/95

[51] Int. Cl.[7] ................................................ B29C 45/52
[52] U.S. Cl. ................................. 425/559; 425/563
[58] Field of Search ..................................... 425/559, 563

[56] References Cited

U.S. PATENT DOCUMENTS 5,167,971 12/1992 Gill et al. ............................. 425/559

FOREIGN PATENT DOCUMENTS 498286 1/1992 European Pat. Off. .
592309 4/1994 European Pat. Off. .

*Primary Examiner*—Tim Heitbrink
*Attorney, Agent, or Firm*—Notaro & Michalos P.C.

[57] ABSTRACT

A backflow blocking arrangement is for an injection unit of an injection molding machine having a plasticising screw with a front end for carrying the backflow blocking arrangement. The arrangement has a screw tip, a blocking bush and a blocking sleeve each with a base body material. The screw tip has friction surfaces and the blocking bush and the blocking sleeve each have sealing and friction surfaces. At least one of the friction and sealing surfaces is formed by a protective layer made of a fusion metallurgical compound of the base body material plus an additive. The additive is any one or more of a metal, a carbide, a carbonitride, a boride, a carboboride, a silicide, a sulfide or an oxide. The screw tip includes a mixed layer between its base body material and its outer layer, that includes the additive. The mixed layer is thinner than the outer layer and both the outer layer and the mixed layer include base body material in specific proportions with the additive. The outer layer and mixed layer are made from metallic mixed crystals and chemical compounds which contain material of the base body and the additive.

23 Claims, 2 Drawing Sheets

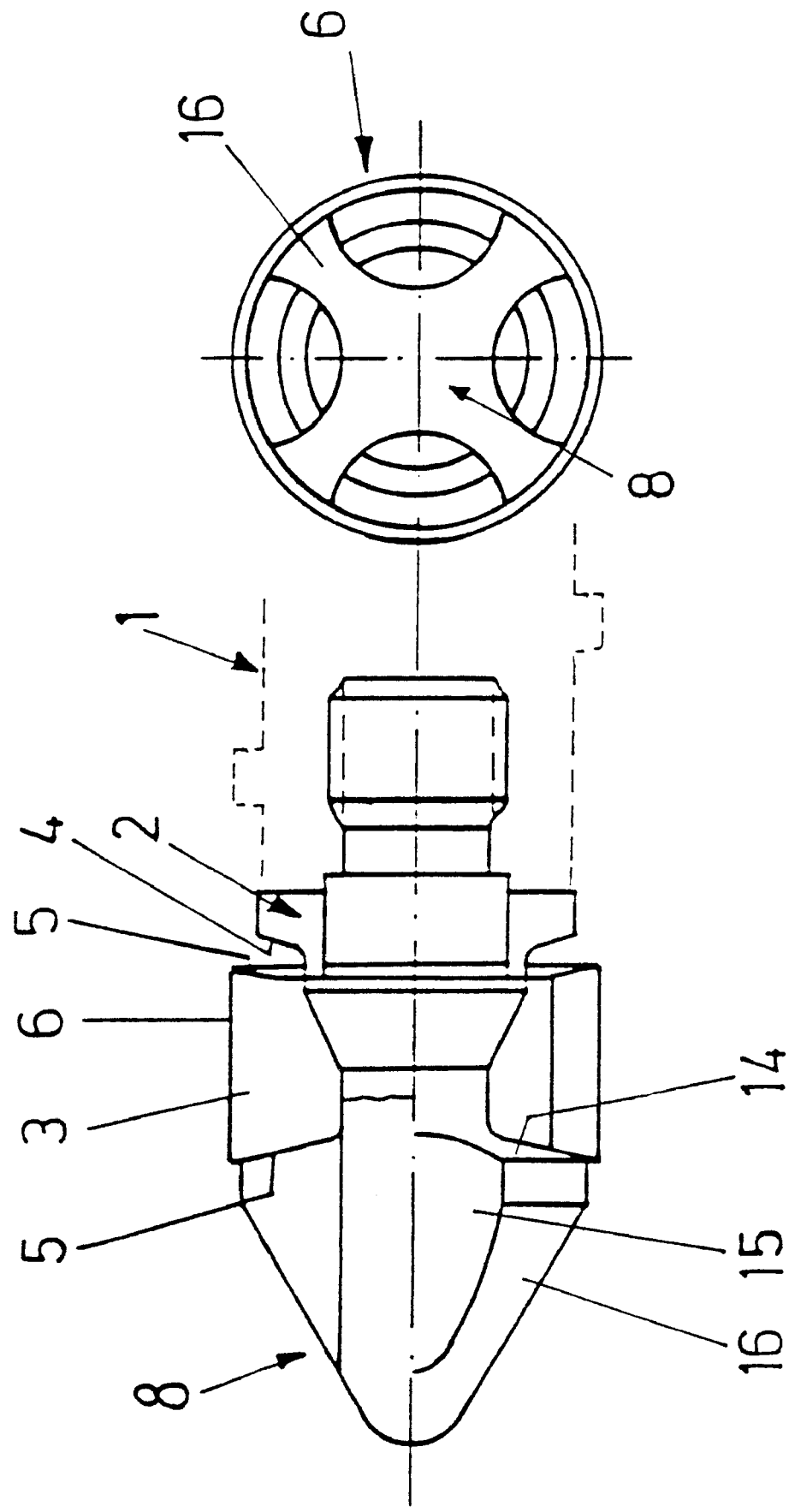

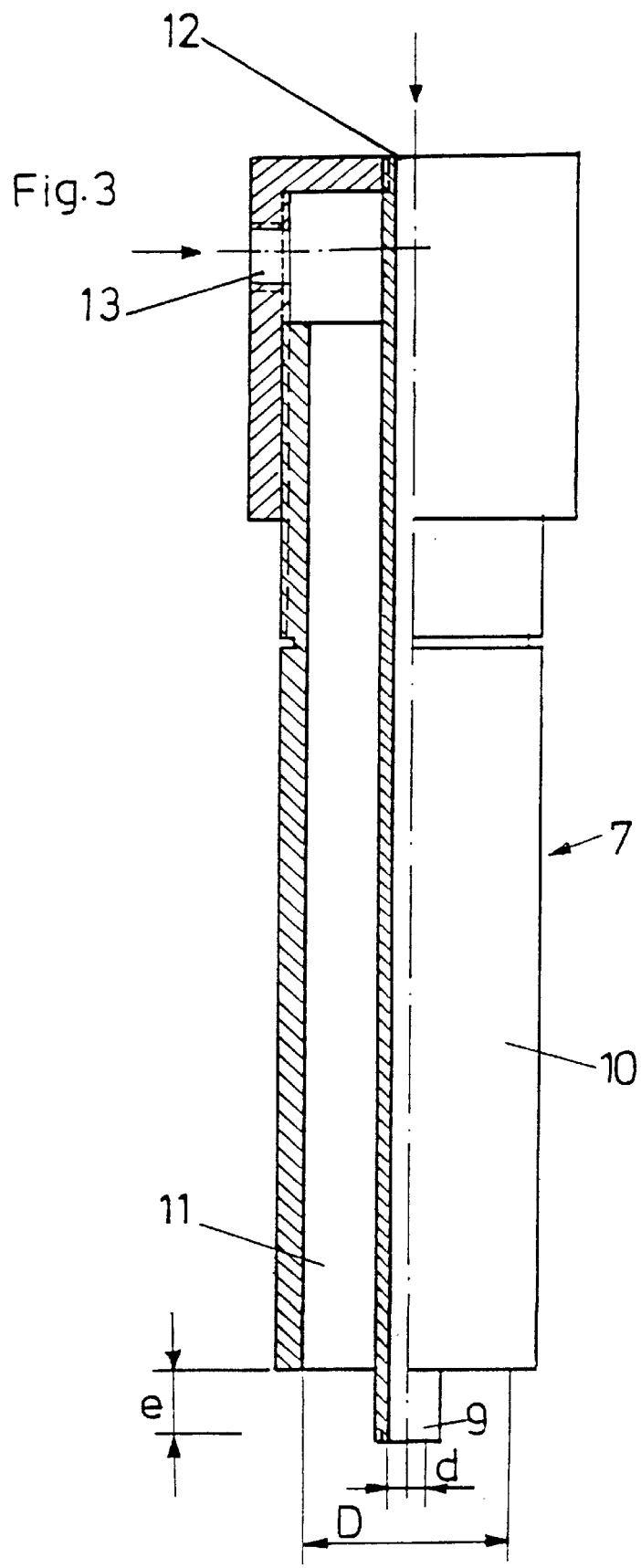

RETURN FLOW SHUT-OFF DEVICE FOR AN INJECTION UNIT IN AN INJECTION MOULDING MACHINE

The invention relates to a backflow blocking arrangement for an injection unit of an injection molding machine having a screw cylinder with a plasticising screw, at the front end of which is arranged the backflow blocking arrangement comprising a screw tip, a blocking bush and a blocking sleeve with corresponding sealing and friction surfaces, wherein at least a portion of at least one friction surface of the screw tip, the blocking bush and/or the blocking sleeve is formed by a protective layer comprising a fusion-metallurgical compound between the respective base body and a supplied or pre-deposited additive material.

The invention further relates to a process for producing such a backflow blocking arrangement.

Backflow blocking arrangements of that kind prevent a backflow of a part of the plastic material during the injection moulding procedure. An example of a backflow blocking arrangement is described in EU-B1-0 212 224.

Backflow blocking arrangements of that kind are subject to high abrasion and corrosion loadings. It is known for individual parts of the backflow blocking arrangement to be provided at the friction surfaces with a hard material layer. In accordance with the known state of the art various coating processes such as flame spraying, high-velocity flame spraying, plasma spraying, detonation spraying, PVD, CVD with or without subsequent heat treatment are used in the treatment of the individual parts of a backflow blocking arrangement. Welding processes, for example PTA-welding and WIG-welding were also used.

The known coatings have relatively thin anti-wear ranges (from the $\mu$m range in the case of CVD and PVD up to some 1/10 mm-layer thicknesses with various spray procedures).

All known coatings have a substantially different normal electrode potential relative to the base body, which is disadvantageous from the corrosion point of view if a non-coated region has a contact surface in relation to a coated region and the assembly is subjected to the action of a medium having a corrosive effect.

Even if the coatings are sintered in position by means of a heat treatment, they always have a relatively brittle contact zone which can give rise to problems when the assembly is subjected to rough mechanical handling. Thus for example breakages, cracks and the like may occur.

In accordance with the known state of the art welding processes are used primarily for build-up welding procedures, for example PTA-welding=plasma powder build-up or transfer welding. In that operation an arc burns between a tungsten electrode and the workpiece. The additive material is generally introduced in powder form. The disadvantage of that process is that it provides for an insufficiently defined mixing effect as between the additive material and the base material. It is therefore not possible to set specific structures. Furthermore the susceptibility to cracking in the armoring is high due to the differences in heat expansion of the build-up or transfer material and the base body. Starting the procedure and stopping the procedure when using conventional welding processes represent further problems.

The known backflow blocking arrangements of this kind cannot therefore be completely satisfactory in terms of their service life. Therefore the object of the present invention is to improve a backflow blocking arrangement and a process for processing the individual base bodies of the parts of a backflow blocking arrangement of the kind set forth in the opening part of this specification, in such a way that the service life of the backflow blocking arrangement is substantially increased insofar as the invention provides a material system particularly suited to that component and a process for the production thereof.

The object according to the invention is attained in that at least the base body of the screw tip comprises a metal material, preferably a chromium-bearing steel material and additive materials such as metals, carbides, carbonitrides, borides, carboborides, silicides, sulfides and/or oxides, preferably compounds of Mo, Ti, Cr, Ni, Co, Nb, V, Al, Ta, W, Zr, Hf, Fe, Mn, Ca, Si, B, C and N are fused in individually or in combination at least at a portion of the friction surfaces of the screw tip, wherein between the base body and the outer zone or layer treated with the additive materials there is a mixed zone or layer which is thinner than the outer zone treated with the additive materials and both zones comprise the base body material and specific proportions of the additives, and that said two zones are made up from metallic mixed crystals and chemical compounds, preferably carbides of the types $MC_{1-x}$, $M_2C$, $M_6C$, $M_7C_3$ and borides of the types M2B and M6B, which contain substances of the base body and/or the additive materials, where the said phases in the outer zone and the mixed zone are set in defined concentration relationships.

The protective layer produced has one or more carbide types, nitride types, carbonitride types, boride types, carboboride types or oxide types which are directly and/or eutectically precipitated out of the molten material, in particular extremely hard monocarbides but also other hard and wear-resistant special carbides and in addition one or more components of metallic mixed crystals. Preferably at least one of the following structural elements occurs in the protective layer:

MC directly out of the molten or fused material,

MC-ferrite or austenite eutectic (austenite is so adjusted in terms of its composition that depending on the respective requirement involved it is maintained up to room temperature, is partially converted into martensite or is completely converted into martensite), $M_7C_3$-austenite or ferrite eutectic (austenite is so adjusted in terms of its composition that depending on the respective requirement involved it remains up to room temperature, is partially converted into martensite or is completely converted into martensite). In particular cases still further phase conversion effects, for example peritectic phase conversion effects, are deliberately implemented, in order to set optimum structural conditions.

The process according to the invention in which there are produced on the friction surfaces of the screw tip and/or the friction or sealing surfaces of the blocking bush and/or the blocking sleeve, metallic, hard-metallic or metal-carbide or ceramic boundary layers which are formed by a fusion-metallurgical compound as between the respective base body and a supplied or pre-deposited additive material, provides that a base body of steel material, preferably with an at least 12% chrome proportion, a tensile strength of at least 800 N/mm$^2$ and a notched-bar impact energy of at least 50 Joules at 20° C. (Charpy V-testpiece) is used, that the surface to be processed is locally fused on by means of an energy source with a locally-average power density acting on the base body of more than 10$^3$ watts/cm$^3$, wherein the maximum molten bath peak temperature is at least 1700° C. and elements of volume in those zones of the base body which form friction or sealing surfaces on the finished part are in a molten condition for a shorter period than 20 seconds and during that time high-melting point additives or mixtures of high-melting point additives are substantially homogenously distributed in the molten bath so that a boundary layer with finely distributed hard substances is formed in the subsequent hardening phase.

The process according to the invention provides that the structural constituents in the mixed zone and the boundary layer are specifically adjusted in terms of size and composition, and furthermore the changes in structure in the region of the base body which is influenced by heat are so controlled that no negative effects occur in terms of corrosion characteristics and the strength of the composite assembly. The additive material is not applied to the base body but fused into same. Preferably high-power radiation sources, in particular lasers, are used.

It is preferably provided that the base bodies of the screw tip, the blocking bush and/or the blocking sleeve comprise iron-based materials, more specifically of the compositions 1.2316 (X36 CrMo 17), 1.2085 (X33 CrS 16), 1.2361 (X91 CrMoV 18), 1.4104 (X14 CrMos 17), 1.4105 (X4 CrMoS 18), 1.4112 (X90 CrMoV 18), 1.4122 (X35 CrMo 17), 1.4528 (X105 CrCoMo 18 2), 1.2379 (X155 CrVMo 12 1), (X39 CrMo 17 1), (X190 CrVMoW 20 4 1), 1.3243 (HS 6-6-2-5), 1.3247 (HS 2-10-1-8) and that metals, carbides, nitrides, carbonitrides, borides, sulfides, silicides and/or oxides, individually or in combination, preferably Mo, Ti, Cr, Ni, Co, Nb, V, Al, Ta, W, Zr, Hf, Fe, Mn, Ca, B, C, N, Si and the above-indicated compounds thereof, are fused in as additive materials at the sealing and/or friction surfaces of the screw tip, the blocking sleeve and/or the blocking bush.

BRIEF DESCRIPTION OF THE DRAWINGS

Embodiments of the invention are described hereinafter with reference to the Figures of the drawing.

FIG. 1 is a view in longitudinal section through a backflow blocking arrangement according to the invention, FIG. 2 is a plan view of the backflow blocking arrangement and FIG. 3 is a partially sectional side view of a nozzle which serves for supplying the coating material during the laser treatment.

The backflow blocking arrangement according to the invention is mounted at the front end of a plasticising screw 1 which is movable in an injection cylinder. The plasticising screw performs on the one hand a rotary movement and on the other hand an axial movement in the plasticising cylinder.

The backflow blocking arrangement comprises a screw tip 8 which is mounted directly on the plasticising screw 1, a blocking sleeve 2 and a blocking bush 3. The blocking bush 3 is freely movable in a certain region on the screw tip 8.

All sealing and friction surfaces 4, 5, 6 and 14 of the base bodies of the screw tip 8, the blocking bush 3 and the blocking sleeve 2 are treated in accordance with the invention by means of a laser beam, wherein the surfaces of the screw tip 8, the blocking sleeve 2 and the blocking bush 3 have been fused on in the processing region and an additive material which is supplied or which has been pre-deposited on the friction surfaces 4, 5, 14 has formed a fusion-metallurgical compound with the respective base body of the blocking sleeve 2, the blocking bush 3 or the screw tip 8 respectively.

During the operation of fusing in the additive materials the laser beam was adjusted in such a way that it was directed at an angle of 30–90° relative to the surface of the workpiece. The proportion of the laser beam which was polarized in parallel relationship with respect to the plane of incidence was more than 60%.

The laser power can be specifically adjusted for example by optical instruments, oscillatory or vibrating mirrors, deformable optics, integration optics, use of a plurality of laser beams or shallow impingement angles.

During the alloying procedure a relative movement is necessary between the respective friction surface 4, 5, 14 or sealing surface 6 and the laser beam. That relative movement can be produced either by virtue of a stationary laser beam and a moving workpiece, by virtue of a moving laser beam and a stationary workpiece or by virtue of movement of the workpiece and the laser beam preferably in mutually opposite relationship.

The alloying procedure can be assisted by the screw tip 8, the blocking sleeve 2 and/or the blocking bush 3 being heated by other heat sources during the laser treatment or immediately prior to or after the treatment.

According to the invention the base bodies of the screw tip 8, the blocking sleeve 2 and the blocking bush 3 comprise iron-based materials, wherein fusion-metallurgical and powder-metallurgical steels were used, preferably of the compositions 1.2316 (X36 CrMo 17), 1.2085 (X33 CrS 16), 1.2361 (X91 CrMoV 18), 1.4104 (X14 CrMoS 17), (X4 CrMoS 18) 1.4112 (X90 CrMoV 18), 1.4122 (X35 CrMo 17), 1.4528 (X105 CrCoMo 18 2), 1.2379 (X155 CrVMo 12 1), (X39 CrMo 17 1), (X190 CrVMoW 20 4 1), 1.3243 (HS6-5-2-5), 1.3247 (HS 2-10-1-8).

A further embodiment of the invention provides that the base bodies of the screw tip 8, the blocking sleeve 2 and the blocking bush 3 comprise fusion-metallurgical or powder-metallurgical cobalt-based or nickel-based materials or ceramic materials.

Metals, carbides, nitrides, carbonitrides, borides, sulfides and/or oxides, individually or in combination, were used as additive materials for processing of the friction surfaces 4, 5, 14 or the sealing surface 6, preferably Mo, Ti, Cr, Ni, Co, Nb, V, Al, Ta, W, Zr, Hf, Fe, Mn, Ca, B, C, N, Si and the above-mentioned compounds thereof. In addition substances which contain sulfur, oxygen, selenium or tellurium were pre-deposited on the friction surfaces 4, 5 or the sealing surface 6 and/or supplied to said surfaces during the laser treatment.

In a specific embodiment by way example, the following base bodies were used:

Screw tip 8: base body of heat-treated steel 1.2316.05 (X36 CrMo 17 V);

Blocking bush 3: base body of steel 1.2379 (X155 CrVMo 12 1); and

Blocking sleeve 2: base body of steel 1.4528 (X105 CrCoMo 18 2).

Vanadium carbide in powder form was supplied to the molten bath as an additive material and in that procedure protective gas was caused to flow therearound.

The operation of fusing on the base body was effected by means of laser beams, in that procedure additive materials were fused in, in a plurality of rings.

After hardening of the protective layer, cutting machining of the base bodies was effected. In the case of the screw tip 8 lateral openings 15 which afford the through-flow cross-sections between the blades or vanes 16 of the screw tip 8 are produced by mechanical machining, preferably by milling, grinding and/or turning. An increase in hardness of up to 300 VH was achieved by the mechanical machining procedure, without additional heat treatment.

The hardness of the friction surface 14 of the screw tip 8 developed as follows:
 blank: 250 VH–340 VH
 after application of the alloy: 600 VH–750 VH
 finished member after the cutting machining procedure: 750 VH–900 VH
 (VH Vickers hardness).

The feed of the additive material was effected in the form of powder which was supplied to the friction surfaces 4, 5, 14 and the sealing surface 6 during the laser treatment. The additive material can also be supplied in the form of solid wire, filler wire, paste or strip or in a combined fashion as powder, solid wire, filler wire, strip or paste, and it can also be pre-deposited on the friction surfaces 4, 5, 14 and the sealing surface 6 prior to the laser treatment.

The fusing-in procedure is effected under a predetermined atmosphere insofar as the screw tip 8, the blocking bush 3 or the blocking sleeve 2 is processed either in a chamber which is closed off in relation to the ambient atmosphere, or insofar as those components are admittedly in the ambient atmosphere, but one or more gas jets of a selected composition is or are caused to flow thereagainst.

The nozzle 7 shown in FIG. 3 comprising an inner tube 9 and an outer tube 10 is suitable for the last-mentioned process.

The coating material in powder form and a gas, preferably argon, are fed at a connection 12 through the inner tube 9 to the friction surfaces 4, 5, 14 or the sealing surface 6, which are to be processed.

The intermediate space 11 between the inner tube 9 and the outer tube 10 serves for the feed of a gas jet which determines the ambient atmosphere for the molten bath. In the illustrated embodiment nitrogen ($N_2$) was supplied to the surfaces to be coated, through the intermediate space and at a connection 13.

In the illustrated embodiment the inner tube 9 projects out of the outer tube 10. The spacing e of the front end of the inner tube 9 relative to the front end of the outer tube 10 is between −20 mm and +20 mm. The diameter of the inner tube 9 is between 2 mm and 6 mm and the diameter D of the outer tube 10 is between 8 mm and 30 mm.

What is claimed is:

1. A backflow blocking arrangement for an injection unit of an injection molding machine, the machine having a plasticising screw (1) with a front end for carrying the backflow blocking arrangement, the backflow blocking arrangement comprising a screw tip (8), a blocking bush (3) and a blocking sleeve (2), each having a base body material, the screw tip having friction surfaces (14), the blocking bush and the blocking sleeve each having sealing and friction surfaces (4, 5, 6), at least one of the friction and sealing surfaces (4, 5, 6, 14) being formed by a protective layer comprising a fusion metallurgical compound of said base body material and an additive material, characterized in that the screw tip (8) comprises a metal base material and at the friction surfaces (14) of the screw tip the additive material comprises at least one of: metals, carbides, carbonitrides, borides, carboborides, silicides, sulfides and oxides; the screw tip including a mixed layer between the base body material of the screw tip and an outer layer of the screw tip that includes the additive material, the mixed layer being thinner than the outer layer and both the outer layer and the mixed layer including base body material of the screw tip and specific proportions of the additive material, said outer layer and mixed layer being made from metallic mixed crystals and chemical compounds which contain material of the base body and the additive material.

2. A backflow blocking arrangement as claimed in claim 1 wherein at least the base body material of the screw tip (8) comprises a chromium-bearing steel material.

3. A backflow blocking arrangement as claimed in claim 1 wherein the additive material is selected from the group consisting of Mo, Ti, Cr, Ni, Co, Nb, V, Al, Ta, W, Zr, Hf, Fe, Mn, Ca, Si, B, C and N.

4. A backflow blocking arrangement as claimed in claim 1 wherein compounds of Mo, Ti, Cr, Ni, Co, Nb, V, Al, Ta, W, Zr, Hf, Fe, Mn, Ca, Si, B, C and N are fused in combination as the additive materials.

5. A backflow blocking arrangement as claimed in claim 1 wherein said outer and said mixed layers contain carbides selected from the group consisting of $MC_{1-x}$, $M_2C$, $M_6C$ and $M_7C_3$ and borides selected from the group consisting of $M_2B$ and $M_6B$.

6. A backflow blocking arrangement as claimed in claim 1 wherein the base body material of at least one of the screw tip (8), the blocking bush (3) and the blocking sleeve (2) comprise iron-based materials.

7. A backflow blocking arrangement as claimed in claim 6 wherein said iron-based materials are chosen from the group consisting of the compositions X36 CrMo 17, X33CrS 16, X91 CrMoV 18, X14 CrMoS 17, X4 CrMoS 18, X90 CrMoV 18, X35 CrMo 17, X105 CrCoMo 18 2, X155 CrVMo 12 1, X39 CrMo 17 1, X190 CrVMoW 20 4 1, HS 6-5-2-5 and HS 2-10-1-8.

8. A backflow blocking arrangement as claimed in claim 1 wherein the base body material of at least one of the screw tip (8), the blocking bush (3) and the blocking sleeve (2) comprise cobalt-based materials.

9. A backflow blocking arrangement as claimed in claim 8 wherein the cobalt-based materials are fusion-metallurgical materials.

10. A backflow blocking arrangement as claimed in claim 8 wherein the cobalt-based materials are powder metallurgical materials.

11. A backflow blocking arrangement as claimed in claim 1 wherein the base body material of at least one of the screw tip (8), the blocking bush (3) and the blocking sleeve (2) comprise nickel-based materials.

12. A backflow blocking arrangement as claimed in claim 11 wherein the nickel-based materials are fusion-metallurgical materials.

13. A backflow blocking arrangement as claimed in claim 11 wherein the nickel-based materials are powder metallurgical materials.

14. A backflow blocking arrangement as claimed in claim 1 wherein the base body material of at least one of the blocking bush (3) and the blocking sleeve (2) comprise ceramic materials.

15. A backflow blocking arrangement as claimed in claim 1 wherein the base body material of at least one of the blocking bush (3) and the blocking sleeve (2) comprise hard-metallic materials.

16. A backflow blocking arrangement as claimed in claim 1 wherein the additive material is fused into the friction surfaces (4, 5, 14) of at least one of the blocking bush (3) and the blocking sleeve (2).

17. A backflow blocking arrangement as claimed in claim 16 wherein the additive material is individually fused into the friction surfaces (4, 5, 14) of at least one of the blocking bush (3) and the blocking sleeve (2).

18. A backflow blocking arrangement as claimed in claim 16 wherein the additive material is selected from the group consisting of Mo, Ti, Cr, Ni, Co, Nb, V, Al, Ta, W, Zr, Hf, Fe, Mn, Ca, Si, B, C and N.

19. A backflow blocking arrangement as claimed in claim 16 wherein the additive material is fused into the friction surfaces (4, 5, 14) of at least one of the blocking bush (3) and the blocking sleeve (2) in combination.

20. A backflow blocking arrangement as claimed in claim 1 wherein the additive material is fused into the sealing surfaces of at least one of the blocking bush (3) and the blocking sleeve (2).

21. A backflow blocking arrangement as claimed in claim 20 wherein the additive material is selected from the group consisting of Mo, Ti, Cr, Ni, Co, Nb, V, Al, Ta, W, Zr, Hf, Fe, Mn, Ca, Si, B, C and N.

22. A backflow blocking arrangement as claimed in claim 20 wherein the additive material is individually fused into the sealing surfaces of at least one of the blocking bush (3) and the blocking sleeve (2).

23. A backflow blocking arrangement as claimed in claim 20 wherein the additive material is fused into the sealing surfaces of at least one of the blocking bush (3) and the blocking sleeve (2) in combination.

* * * * *